US009449777B2

(12) United States Patent
Sievi-Korte et al.

(10) Patent No.: US 9,449,777 B2
(45) Date of Patent: Sep. 20, 2016

(54) CIRCUIT BREAKER ARRANGEMENT AND POWER DISTRIBUTION UNIT

(71) Applicants: Juha Markus Sievi-Korte, Pirkkala (FI); Tarmo Aulis Ahola, Tarvaala (FI); Ari Pekka Kurjanen, Tampere (FI)

(72) Inventors: Juha Markus Sievi-Korte, Pirkkala (FI); Tarmo Aulis Ahola, Tarvaala (FI); Ari Pekka Kurjanen, Tampere (FI)

(73) Assignee: EFORE OYJ, Espoo (FI)

(*) Notice: Subject to any disclaimer, the term of this patent is extended or adjusted under 35 U.S.C. 154(b) by 139 days.

(21) Appl. No.: 14/279,599

(22) Filed: May 16, 2014

(65) Prior Publication Data

US 2014/0340801 A1 Nov. 20, 2014

(30) Foreign Application Priority Data

May 16, 2013 (EP) .................................... 13167957

(51) Int. Cl.

| | |
|---|---|
| ***H02H 3/08*** | (2006.01) |
| ***H01H 83/20*** | (2006.01) |
| *H01H 71/66* | (2006.01) |
| *H01H 71/68* | (2006.01) |
| *H01H 71/70* | (2006.01) |

(52) U.S. Cl.

CPC .............. *H01H 83/20* (2013.01); *H01H 71/66* (2013.01); *H01H 71/68* (2013.01); *H01H 71/70* (2013.01); *H01H 2071/665* (2013.01)

(58) Field of Classification Search

CPC ........ H02H 3/08; H01H 71/66; H01H 71/68; H01H 71/70; H01H 83/20; H01H 2071/665

USPC ........................................................... 361/87

See application file for complete search history.

(56) References Cited

U.S. PATENT DOCUMENTS

| | | | |
|---|---|---|---|
| 5,875,087 | A | 2/1999 | Spencer et al. |
| 6,195,243 | B1 | 2/2001 | Spencer et al. |
| 6,326,870 | B1 | 12/2001 | Larranaga et al. |
| 6,522,227 | B1 | 2/2003 | Mody et al. |
| 2005/0001700 | A1 | 1/2005 | Lewis |

(Continued)

FOREIGN PATENT DOCUMENTS

| | | |
|---|---|---|
| JP | H04-112619 | 4/1992 |
| JP | 2009-163882 | 7/2009 |
| KR | 1020100028508 | 3/2010 |

OTHER PUBLICATIONS

EP Search Report, dated Sep. 30, 2013, from corresponding EP application.

*Primary Examiner* — Thienvu Tran
*Assistant Examiner* — Kevin J Comber
(74) *Attorney, Agent, or Firm* — Young & Thompson

(57) ABSTRACT

A circuit breaker arrangement in supply of electric power has advantageous applications especially in power distribution units which supply DC power to electrical devices. Electromechanical circuit breakers are commonly used for circuit protection. They have a disadvantage of fixed tripping conditions, which can only be changed by changing the circuit breaker component. This is solved by providing a circuit breaker arrangement which has an electromechanical circuit breaker with a first, fixed tripping condition, and an additional circuit, which monitors the output current and mechanically trips the circuit breaker if the current exceeds a second tripping condition. This way, it is possible to use the first tripping condition of the electromechanical circuit breaker and/or a second, controllable tripping condition.

13 Claims, 4 Drawing Sheets

(56) References Cited

U.S. PATENT DOCUMENTS

2006/0244557 A1* 11/2006 Sorenson ............... H01H 71/68 335/172

2013/0076161 A1* 3/2013 Li ......................... H01F 7/1615 310/14

2013/0335888 A1* 12/2013 Cavazos ................ H01H 71/70 361/624

* cited by examiner

CIRCUIT BREAKER ARRANGEMENT AND POWER DISTRIBUTION UNIT

FIELD OF INVENTION

The present invention relates generally to circuit breaker arrangement in supply of electric power. More specifically, the present invention relates to what is disclosed in the preambles of the independent claims. The invention can be used e.g. in power distribution units between power supplies and loads.

BACKGROUND

Power supplies, such as switching power supplies, are used for providing direct current (DC) supply for various electronic devices, such as base stations in a cellular communications system. Such power supplies have certain output current limits, which must not be exceeded. It is common to use circuit breakers in order to protect power supplies from excessive currents due to overloads. The circuit breakers also protect wiring in high energy circuits and limit outages in case of fault conditions. A fault in one unit thus does not cause breakdown of other units of the same power supply.

A common type of a circuit breaker is an electromechanical circuit breaker. Such a circuit breaker has a fixed current limit or fixed tripping curve, and exceeding current limit or tripping curve causes the circuit breaker to trip. A circuit breaker usually has a lever at its front panel for resetting the circuit breaker. Electromechanical circuit breakers are produced in large quantities, and they are standard, reliable and low cost components, which have been approved by authorities.

However, there are some problems related to the electromechanical circuit breakers. After tripping they need to be manually reset. Electrical devices may be installed in remote locations, and it may require much effort and time to travel to such locations. Tripping of a circuit breaker may be caused by reasons which do not require repairing the electrical devices. In such situations it is still necessary to travel to the installation location in order to reset circuit breaker. To solve this problem there are arrangements for resetting a circuit breaker with remote control. Such a solution is disclosed in patent application document U.S. Pat. No. 6,522,227 B1.

Another problem with electromechanical circuit breakers relates to the fixed tripping current limit or fixed tripping curve. There are various situations where the current limit of a circuit breaker needs to be changed. In order to change the current limit the circuit breaker must be changed to a different one. Changing a circuit breaker requires servicing work at the installation location of the electrical device. It is also possible that a circuit breaker with the required current limit is not available. In such case it is necessary to use a circuit breaker with non-optimal, lower current limit. This may cause unnecessary tripping of the circuit breaker.

SUMMARY OF THE INVENTION

It is an object of the present invention to provide circuit protection for various applications, wherein the described disadvantages of the prior art are avoided or reduced. The object of the invention is therefore to achieve overload protection with advantages of standard, approved electromechanical circuit breakers, and possibility to control/select the tripping conditions.

The object of the invention is achieved by providing a circuit breaker arrangement which has an electromechanical circuit breaker with a first, fixed tripping condition. The first tripping condition is based on the original default tripping curve of the circuit breaker. The arrangement also has an additional circuit, which monitors the output current and mechanically trips the circuit breaker if the current exceeds a second tripping condition. The second tripping condition is an auxiliary condition implemented by the present invention. This way it is possible to use the first tripping condition of the electromechanical circuit breaker and/or a second, controllable tripping condition.

More specifically, the object of the invention is achieved by providing a circuit breaker arrangement on at least one power distribution line, the arrangement comprising an electromechanical circuit breaker connected to the power distribution line, wherein the electromechanical circuit breaker has means for disconnecting the current of the power distribution line when the current of the power distribution line exceeds a first tripping condition of the circuit breaker, and the electromechanical circuit breaker comprises a lever, which has ON and OFF positions, whereby turning the lever into ON/OFF position is arranged to connect the current of the distribution line ON/OFF respectively, wherein the arrangement further comprises an additional circuit which has:

- sensor means for measuring current of the power distribution line;
- means for setting a second tripping condition;
- control means for comparing the value of the measured current with the second tripping condition; and
- actuator means for mechanically turning the lever of the electromechanical circuit breaker;

wherein the control means are arranged to drive the actuator means turn the lever of the electromechanical circuit breaker into OFF position when the second tripping condition is met, and hence disconnecting the current of the distribution line.

The invention also relates to a power distribution unit for supplying electrical power from at least one power supply to at least one load, wherein the power distribution unit has a circuit breaker arrangement according to the present invention, wherein the arrangement comprises at least one electromechanical circuit breaker, sensor means and actuator means for at least one power distribution line.

Some preferable embodiments of the present invention are described in dependent claims.

According to one embodiment of the invention the tripping conditions include a nominal current value, and tripping is arranged to take place when the current value of the power distribution line exceeds the nominal current by a predetermined amount, such as a predetermined percentage of the nominal current.

According to another embodiment the tripping conditions include tripping curve data comprising current level values and corresponding values of trip threshold time lengths. The control means are adapted to monitor the time each current level is exceeded within a predetermined time window and to monitor possible exceeding of the trip threshold time lengths. The exceeding of a threshold time length indicates meeting the tripping condition.

In one embodiment of the invention the control means comprise a programmable microcontroller. The means for setting the second tripping condition may comprise means for manually selecting a nominal current value to an input of the control means. The means for setting the second tripping condition may additionally or alternatively comprise a digital control interface for inputting data on the second tripping condition to the control means and/or selecting a second tripping curve. It is also possible to determine with these setting means whether the first and/or the second tripping condition is used. The digital interface for the control means may also be used for providing status or alert information of the overload protection arrangement. The control means may also receive ON/OFF control commands via the digital control interface for controlling the electromechanical circuit breaker ON/OFF. The arrangement may also comprise means for remotely communicating with the control means with wired or wireless data transfer. It is thus possible to perform the above controls remotely.

According to one further embodiment of the invention the actuator means comprise a solenoid and a ferromagnetic or permanent magnet core inside the solenoid, the core being movable by supplying current in the solenoid for setting a lever of a circuit breaker into OFF position. In one further embodiment the actuator means also have functionality for resetting the lever of the electromechanical circuit breaker into ON position.

In one implementation of the invention the actuator means comprise a first solenoid, a second solenoid, and a ferromagnetic or permanent magnet core inside the first and second solenoids, wherein the core is movable in a first direction by supplying current in the first solenoid for moving the lever of a circuit breaker into OFF position, and the core is movable in a second direction by supplying current in the second solenoid, or successively in the first solenoid and in the second solenoid, for moving the lever of the circuit breaker into ON position.

In another implementation of the invention the actuator means comprise a solenoid and a permanent magnet core inside the solenoid, wherein the core is movable in a first direction by supplying a first current in the solenoid for moving the lever of a circuit breaker into OFF position, and the core is movable in a second direction by supplying a second current in the solenoid for moving the lever of the circuit breaker into ON position, whereby the first and second currents have opposite directions in the solenoid.

In one preferable embodiment of the invention the arrangement has two or several electromechanical circuit breakers, sensor means and actuator means for corresponding power distribution lines. Such an arrangement may comprise individual control means for each actuator means and/or common control means for controlling two or several actuator means. The actuator means for resetting circuit breakers may be individual, each actuator means arranged to reset the lever of one electromechanical circuit breaker into ON position. The arrangement may also include common actuator means, which are arranged to reset the levers of the at least two electromechanical circuit breakers into ON position simultaneously. The actuator means may comprise one or several motors for the simultaneous resetting of several circuit breakers and/or one or several motors for resetting circuit breakers individually.

The present invention has substantial advantages over prior art solutions. It is possible to select the tripping current limit without changing circuit breakers of the device. It is also possible to change the tripping current limit or control the power distribution lines ON/OFF remotely, whereby it is not necessary to travel to the location of the device installation. The value of the tripping current limit can be adjusted or selected according to requirement, it is not necessary to select the tripping current value from a small number of predefined fixed values. Further, it is possible to provide functionality for automatic or remote resetting of the circuit breaker. These functions can be achieved by using standard electromechanical circuit breakers for switching the current ON/OFF, whereby the advantages of the prior art technology are also obtained. And further, if the additional overload protection circuit would not be operative for some reason, the electromechanical circuit breaker will provide a backup overload protection as it trips according to its nominal tripping condition independently on the additional overload protection circuit.

It is also possible to use the arrangement for remote ON/OFF control of individual power distribution lines without overload condition. This enables energy savings, because shutting down the feeding supply with remotely controlled on/off interfaces one can conserve more energy by mechanically turning off devices not needed. Even all auxiliary powers will be shut off from the units, which is not possible in other, prior art arrangements.

In this patent application the term "power supply" means any source of electrical power. It may preferably mean a switching power supply with a DC output, but it may also mean a solar or wind power generator or mains power supply or other sources of DC or AC electrical power.

In this patent application the term "power distribution line" means a line supplying electrical power from any power supply to a load.

BRIEF DESCRIPTION OF THE DRAWINGS

The described and other advantages of the invention will become apparent from the following detailed description and by referring to the enclosed drawings where.

DETAILED DESCRIPTION

Figure 1:
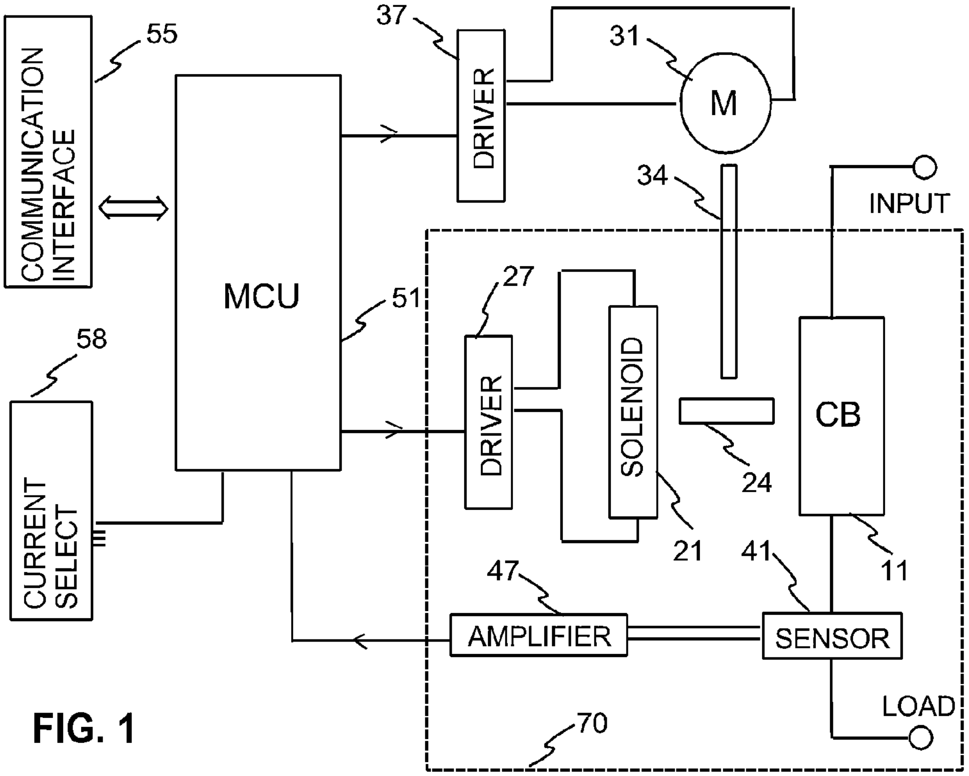
FIG. 1 illustrates a block diagram of an exemplary circuit breaker arrangement and an exemplary power distribution unit according to the invention.

FIG. 1 illustrates an exemplary arrangement and power distribution unit as a block diagram. A power line from a power supply is connected to an input of an electromechanical circuit breaker 11 (CB). The circuit breaker is a standard circuit breaker with a fixed nominal current. Tripping of the circuit breaker may be based on exceeding the nominal current with a predetermined amount, or tripping may be based on a fixed current-time curve, for example.

The arrangement has a current sensor 41 between the electromechanical circuit breaker 11 and load. The output signal of the current sensor is amplified with a signal amplifier 47, and the amplified signal is led to a microcontroller unit 51 (MCU). The current value of the power line is monitored in the MCU and compared to stored tripping data, i.e. current limit and/or stored values of a current-time curve. There may be a manual current selector 58 for selecting a tripping curve that is stored in a memory of the MCU or an external memory. The power distribution unit may preferably also have a digital interface 55 for inputting the tripping curve data into the memory of the MCU and/or for selecting a tripping curve that is already stored in the memory. Such a digital interface may be used for other purposes as well, such as receiving status or alert information of the power distribution unit, and for controlling the electromechanical circuit breakers ON/OFF. The digital interface may also be used remotely by using wired or wireless data transfer. This way it is possible to control and monitor the operation of the power distribution unit remotely, without a need to travel to the location of installation. It is also possible to control the power distribution lines ON/OFF locally or remotely even when in normal condition (no overload or malfunction). OFF control may be used in a normal condition due to energy saving or servicing of a load, for example. ON control may be used for recovering after overload or just to turn on the load.

The arrangement has a solenoid 21 with a movable ferromagnetic or permanent magnet core 24 for resetting/setting the lever position of the circuit breaker. The MCU controls a driver 27, which outputs a current to the solenoid. When the current of the solenoid forms a magnetic field the core and the lever are moved. The solenoid is used in this example for tripping the electromechanical circuit breaker to OFF state. It is also possible to use a solenoid for resetting the circuit breaker into ON state. This function can be implemented by using two solenoids, one for tripping and one for resetting the circuit breaker. Alternatively, a permanent magnet core and bipolar drive current of a single solenoid can be used. It is also possible to use a motor, which can be individual to the circuit breakers and/or common to several circuit breakers. These alternative implementations are described in more detail below in the description of FIGS. 2 and 3.

FIG. 1 shows a motor 31 which moves a tray 34. The tray can be connected to levers of one or several circuit breakers. The motor can be controlled, for example, to reset all circuit breakers of the power distribution unit simultaneously. After resetting the circuit breakers the tray is driven to its original position to allow the circuit breakers to trip if tripping conditions are met. The motor is driven by a driver 37, which is controlled by the MCU 51.

A power distribution unit has usually several load outputs with corresponding overload protection, but it is also possible that a power distribution unit has just one or two outputs. The input power may be received from one common power supply or several power supplies. The power distribution unit may have a common MCU with its interfaces and a common motor 31 with its driver 37 for all overload protection circuits. The dashed line 70 shows parts of the power distribution unit which are individual for each load output.

Figure 2:
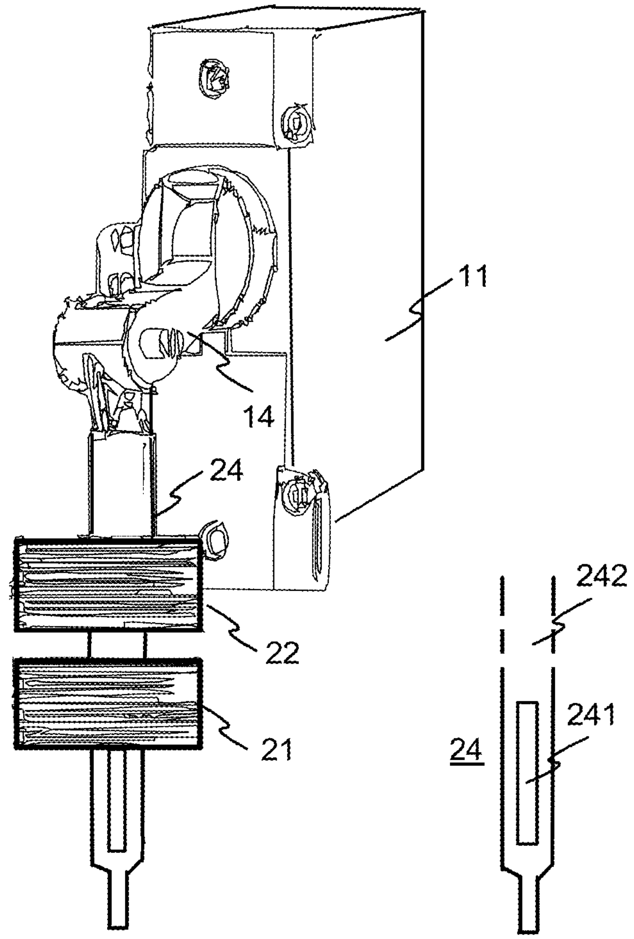
FIG. 2 illustrates an exemplary arrangement according to the invention for controlling the lever of an electromechanical circuit breaker with a solenoid.

FIG. 2 illustrates an example of a mechanical structure for turning a lever with a solenoid. An electromechanical circuit breaker 11 has a lever 14 with ON and OFF positions. FIG. 2 shows the lever in OFF position. The circuit breaker of FIG. 2 is ON when the lever is in its upper position, and the circuit breaker is OFF when the lever is in its lower position. A movable core 24 is attached to the lever with an articulating joint. The core preferably includes ferromagnetic material such as steel, which is embedded inside a non-ferromagnetic cover. The core is moved by energizing a solenoid which consists of two coils 21 and 22. When a solenoid is energised, a ferromagnetic core tends to move towards a middle position inside the solenoid. Therefore, in FIG. 2 the ferromagnetic part 241 of the core is shorter than the whole core, and the rest of the core 242 is made of non-ferromagnetic material. Coil 21 is used for tripping the lever from ON position to OFF position. If the control arrangement is not used for resetting the circuit breaker it is not necessary to include the coil 22. Coil 22 is used for resetting the lever from OFF position to ON position. The two coils can also be used in two phases for resetting the lever. Coil 21 is energized in the first phase, which causes the core to move a little. In the second phase only coil 22 is energized, which causes the core 24 and the lever 14 to move in its end position. Activating the two coils successively for resetting the lever may be necessary because a higher force is generally required for resetting the lever into ON position than for setting the lever into OFF position. It is also possible to use only one coil for both tripping and resetting the lever. In this embodiment a permanent magnet is used in the core, and the direction of the core movement is determined by the direction of the current applied in the coil. A permanent magnet may cover a part or the whole length of the core.

There are various alternatives in the design of solenoids and cores. The number and position of solenoids vs core 24, the length of core 24, the length of the ferromagnetic/permanent magnet part of the core 241 and its positioning inside core 24, the direction and magnitude of the solenoid(s) current, as well as the sequence in which currents are driven through solenoids, are designed in a way to exert a mechanical force on the core 24 with adequate magnitude and sense (downwards or upwards) in order to trip or reset the breaker in response to the said currents.

Figure 3:
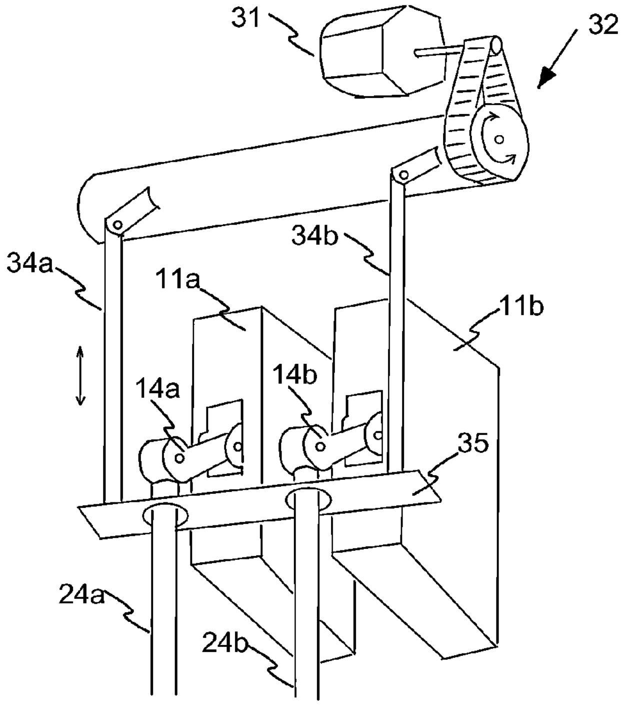
FIG. 3 illustrates an exemplary arrangement according to the invention for resetting levers of electromechanical circuit breakers with a motor.

FIG. 3 illustrates another solution for resetting the electromechanical circuit breakers. The Figure shows two circuit breakers 11*a* and 11*b*, but the number of circuit breakers may naturally be different from two. The circuit breakers of FIG. 3 are ON when the levers are in upper positions, and the circuit breakers are OFF when the levers are in lower positions. The resetting of the circuit breaker generally requires a much higher force than tripping, and it may be difficult to provide such a force with a solenoid and a core. In the arrangement of FIG. 3*a* motor 31 is used for resetting. The rotation of the motor is converted into a linear, movement of shafts 34*a* and 34*b* with a mechanical converter structure 32. There are various known alternatives available for implementing such a mechanical converter.

The shafts 34*a* and 34*b* are attached to a tray 35 for turning the levers 14*a* and 14*b* of the circuit breakers 11*a* and 11*b*. In this example, the tripping function is implemented with cores 24*a* and 24*b* which are moved with corresponding solenoids. The resetting function is implemented with a tray 35, which resets simultaneously the levers of all circuit breakers of the arrangement. When the motor 31 is energized the shafts 34*a* and 34*b* lift the tray 35 upwards in the Figure, and the tray resets the levers of the circuit breakers. After resetting the motor is driven in opposite direction in order to return the tray in the nominal lower position so that the levers may trip freely. If one or several circuit breakers should remain in OFF state, it/they can be set into OFF state by energizing the related solenoid(s) after the resetting.

Figure 4:
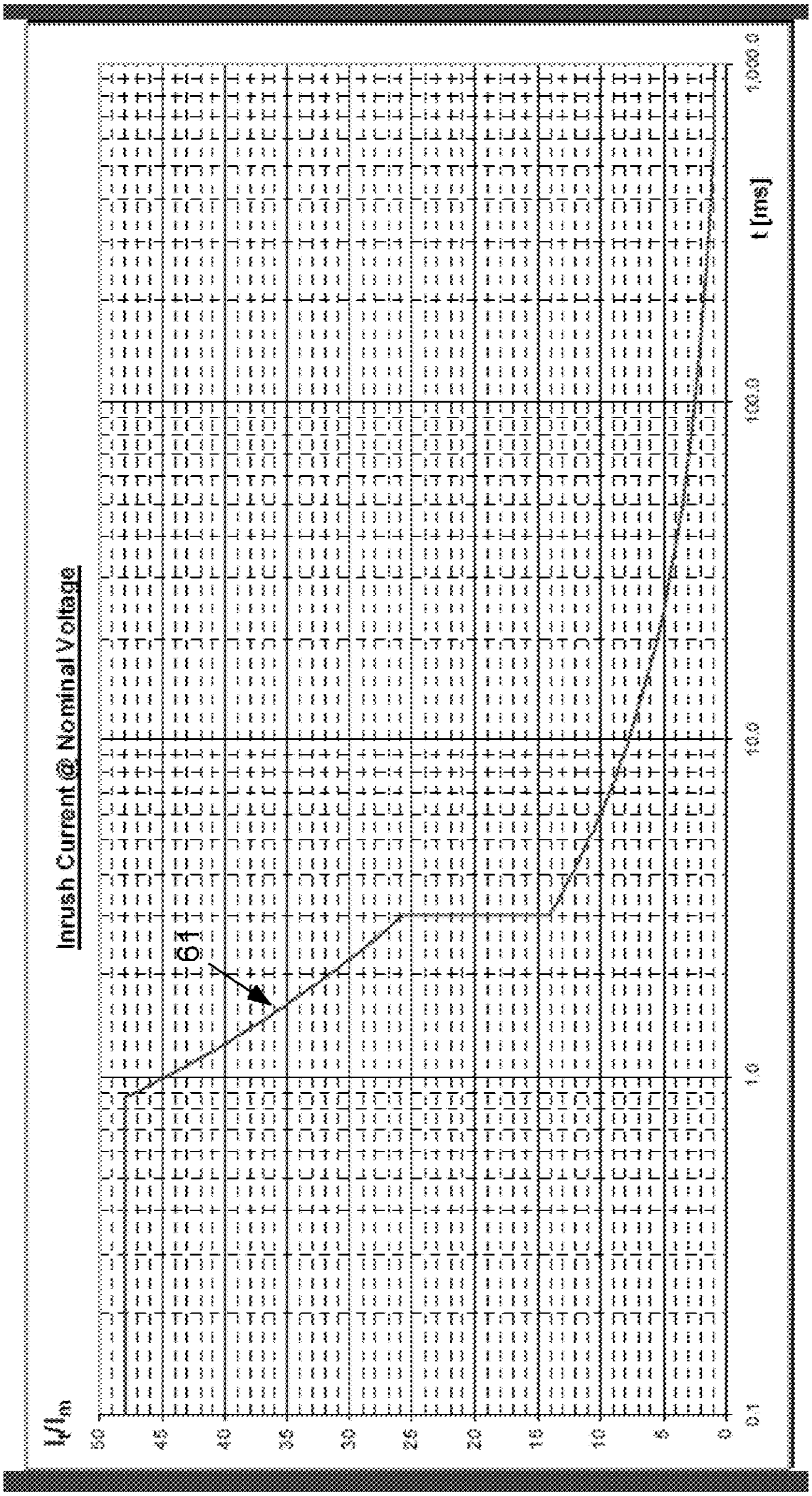
FIG. 4 illustrates a graph of tripping curve consisting of maximum time lengths as a function of current levels.

FIG. 4 illustrates an example of a tripping curve which can be used for determining tripping conditions. The exemplary graph 61 shows maximum time lengths as a function of current values. The horizontal axis denotes time length and the vertical axis denotes ratio between instantaneous current value and the rated nominal current value of a power supply. The graph of FIG. 4 is determined by ETSI (European Telecommunications Standards Institute) standard EN 300 132-2. The graph shows the maximum inrush current for telecommunications equipment at nominal voltage and maximum load. In order to avoid exceeding the values of the graph, it is preferable to use smaller time length values for trip thresholds than shown in the graph. The difference between the time values of the graph and the trip threshold values of the overload protection device depend on the current measurement accuracy, timing resolution etc. of the overload protection arrangement.

Next the operation of an exemplary overload protection arrangement is described, when the tripping condition of the overload protection arrangement is based on a tripping curve. Initially it is determined which current steps are monitored and which are the time lengths used as tripping thresholds. This data is stored in the memory of the microcontroller unit. The current of the switching element is then measured with the current sensor of the arrangement.

When the current exceeds a current step, it is then monitored how long time the exceeding of the current step occurs within a specified time window, for example. Next it is checked whether said time length exceeds the time threshold which is defined for the monitored current step. If a time threshold is not exceeded the current measurement and time measurement continues. If the time threshold is exceeded the electromechanical circuit breaker is switched OFF, which means that the overload protection arrangement trips.

Exceeding the trip threshold means that an overload situation has occurred, and this may damage the power supply if the supplying of power is continued. Therefore, the switching element is not automatically switched back ON. It may be necessary, for example, that a user acknowledges the overload condition and activates the control means to switch ON the power to the load again after tripping.

It should be noted that there are several possibilities to implement the trip monitoring. The number of current steps may be e.g. six, but it may alternatively be lower or higher. The sampling time in current measurement may be e.g. 1 ms, but it may alternatively be lower or higher. These parameters may be programmable.

It is preferable to apply a measurement time window for trip monitoring. Such a time window may have a length of one second, for example. The exceeding of monitored current levels during the time window is then recorded and cumulated. If a time threshold for any current level is exceeded within the time window the switching element is switched OFF, i.e. tripped. After a time window is over, the recorded time values of exceeding current levels are reset, and the new time window can be started with zero cumulated time values of exceeded current levels. A new time window may start when a current level is next exceeded. It is also possible that time windows are automatically repeated.

As an alternative, it is possible to apply a sliding time window. In this case, the recorded time lengths of exceeding current levels are cumulated from the data recorded within latest time window. This procedure is more accurate, but it requires more efficient data processing.

Figure 5:
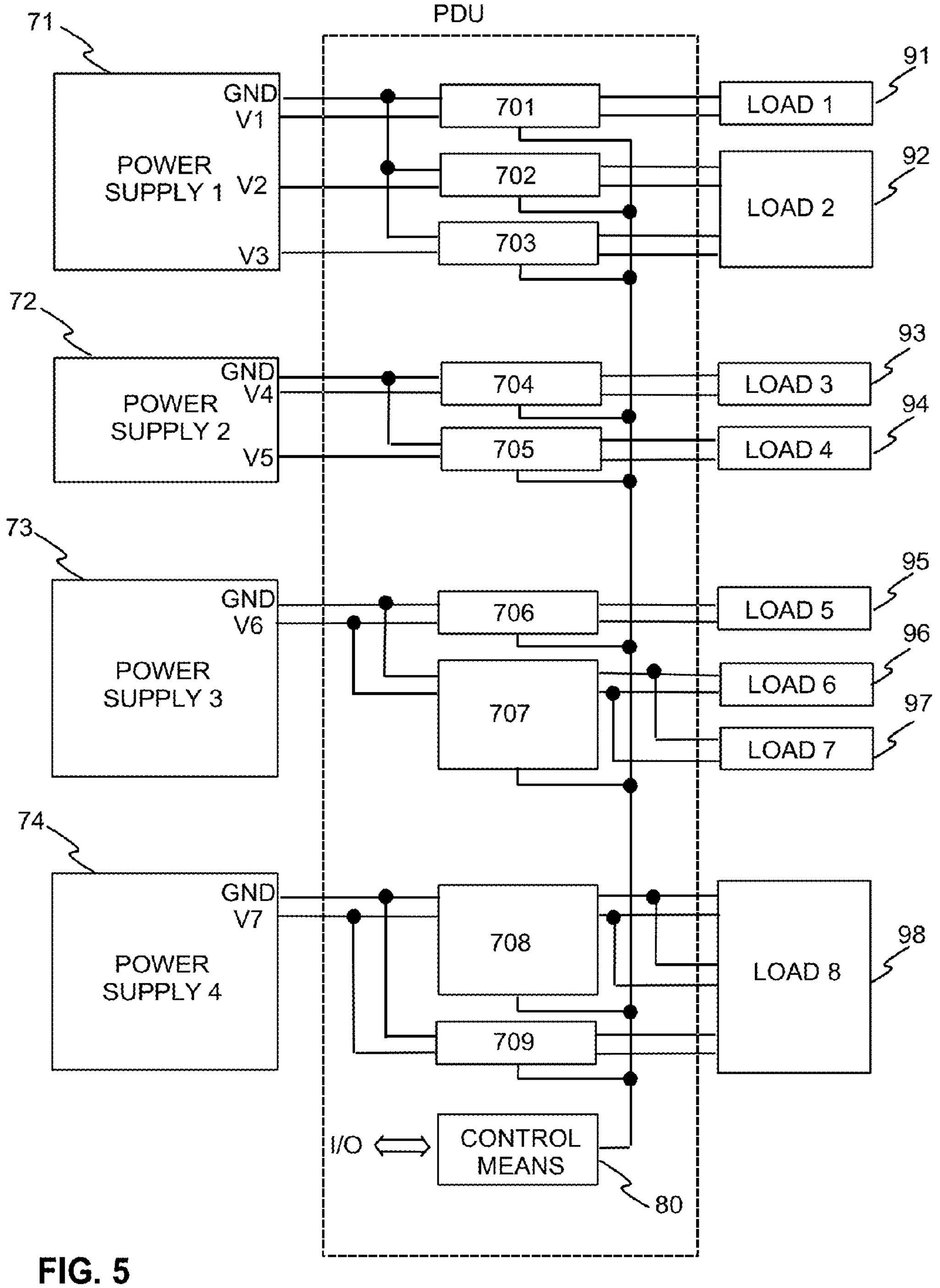
FIG. 5 illustrates a power supply system with an exemplary power distribution unit according to the invention.

FIG. 5 illustrates an exemplary system for supplying power from four power supplies 71-74 to eight loads, 91-98 through a power distribution unit PDU. The loads 91 and 93-97 have one power input, the load 92 has two power inputs, and the load 98 has three power inputs. The system has a first power supply 71, which has three outputs V1, V2 and V3. The first power supply provides power for the loads 91 and 92. A second power supply 72 has two outputs V4 and V5. The second power supply provides power for the loads 93 and 94. The third power supply 73 has one power output V6, which provides power for three loads 95, 96, and 97. The fourth power supply 74 has one output, which provides power for three power inputs of a single load 98.

The power distribution unit includes protection circuits 701-709, which include electromechanical circuit breakers, and actuator means which are individual for each circuit breaker in this example. The protection circuits correspond to the circuit 70 in FIG. 1. The power distribution unit also has control means 80 which may include a microcontroller, memory, and I/O interface. The control unit controls the actuator means and receives signals that correspond to output current. Each six power connections of loads 91-95 each have an individual protection circuit 701-706. Loads 96 and 97 have a common protection circuit 707. Load 98 has one protection circuit 708 for two power inputs and another protection circuit 709 for a third power input.

It should be noted that the number of power supplies, overload protection circuits or loads in a power distribution unit is not in any way limited to the mentioned numbers. A power distribution unit may thus have inputs for one or several power supplies, and a power supply may have one or several power outputs. One overload protection circuit may provide power for one or several loads, and a load may have one or several power inputs. And further, one load may receive power from one or several overload protection circuits. It is preferable that the inputs and outputs of the overload protection circuits have a common ground.

The overload protection circuits can be programmed with e.g. a serial or parallel control interface 55 of a microcontroller unit. The overload protection circuits may have individual addresses for individual control. It is also possible that wired or wireless data transfer is arranged for remote control of the overload protection circuits. The control output data may include e.g. status, alert and history information concerning the operation of the overload protection circuits. It is also possible to use the remote control for turning the device ON/OFF, for example.

The control means can be initially programmed during production, and/or they can be programmed locally during installation and maintenance, and/or they can be programmed remotely from a central control facility, for example. The programming refers to installing and updating programs for a microprocessor and/or storing data for trip curves, for example. The control means may send history, status, alerts and measurement information to such a remote control centre. It is also possible that the overload protection circuits transfer their status, alerts and other possible information to the processors of the power supplies which they are connected to. This way a power supply may switch OFF, for example, if a circuit breaker at its output has tripped.

In this patent specification the structure and components of the arrangement is not described in more detail as they can be implemented using the description above and the general knowledge of a person skilled in the art.

The control functions of the overload protection circuit can be implemented with analogue circuits, such as an ASIC circuit, whereby a simple implementation would be achieved. In such an implementation the tripping conditions can be determined by analogue filters, for example. However, to achieve a more advanced functionality, a digital implementation is preferred. When a microcontroller/processor is used the circuit requires a suitable processor program, which is executed in a device. To convert a known device or system into equipment according to the invention it is necessary, in addition to the hardware modifications, to store into the memory means a set of machine-readable instructions that instruct the microprocessor(s) to perform the functions described above. Composing and storing into memory of such instructions involves known technology which, when combined with the teachings of this patent application, is within the capabilities of a person skilled in the art.

Above, only some embodiments of the solution according to the invention have been described. The principle according to the invention can naturally be modified within the frame of the scope defined by the claims, for example, by modification of the details of the implementation and ranges of use.

The features of the present invention can be implemented in various combinations. For example, following combinations are possible:

using one solenoid and movable core for tripping a circuit breaker without a resetting mechanism, using two solenoids and a movable core in order to provide both tripping and resetting functions, using one solenoid with a movable permanent magnet core for in order to provide both tripping and resetting functions, and using a solenoid and a movable core for tripping a circuit breaker and a motor for resetting the circuit breaker.

It is also possible that a power distribution unit according to the invention has circuit breakers which are not tripped by a solenoid but which can be reset with a solenoid or a motor.

Its should also be noted that a “second tripping condition” may include several alternative tripping conditions which are selectable. Tripping conditions may be individual to each circuit breaker, but they may also be common for a group of circuit breakers.

Although the invention has been described with embodiments where DC current is supplied it is clear that the overload protection circuit according to the present invention is also applicable to loads with AC current supply.

The present invention can be applied in DC and AC power distribution for various purposes, such as telecommunication systems, electric car applications, solar panels etc.

The invention claimed is:

1. A power distribution unit for supplying electrical power from at least one power supply to at least one load, the power distribution unit comprising:

a circuit breaker arrangement on at least two DC power distribution lines, the arrangement comprising:

at least two electromechanical circuit breakers connected to the at least two DC power distribution lines, the electromechanical circuit breakers each including a disconnection system to disconnect the current of the power distribution line when the current of the power distribution line exceeds a first tripping condition of the circuit breaker, the at least two electromechanical circuit breakers each comprising a lever having ON and OFF positions, whereby turning the lever into the ON/OFF positions connects/disconnects the current of the power distribution line ON/OFF respectively; and an additional circuit comprising two sensors configured to measure current of the power distribution lines means for setting at least one second tripping condition, a controller configured to compare the value of the measured current with the at least one second tripping condition, and two actuators configured to mechanically turn the levers of the electromechanical circuit breakers, the controller being configured to drive the actuators to turn one or more of the levers of the electromechanical circuit breakers into the OFF position when one or more the at least one second tripping condition is met thereby disconnecting the current of one or more of the distribution lines, wherein the controller is a common controller provided for controlling the two actuators.

2. The power distribution unit in accordance with claim 1, wherein the at least one second tripping condition includes a nominal current value, and tripping takes place when the current value of the power distribution line exceeds the nominal current by a predetermined amount.

3. The power distribution unit in accordance with claim 1, wherein the at least one second tripping condition includes tripping curves data comprising current level values and corresponding values of trip threshold time lengths, and the additional circuit controller monitors the time each current level is exceeded within a predetermined time window and monitors possible exceeding of the trip threshold time lengths, wherein the exceeding of a threshold time length indicates meeting the one or more of the at least one second tripping condition.

4. The power distribution unit in accordance with claim 1, wherein the means for setting the at least one second tripping condition comprise means for manually selecting the at least one second tripping condition.

5. The power distribution unit in accordance with claim 1, wherein the means for setting the at least one second tripping condition comprises a digital control interface configured to input data of the at least one second tripping condition to the control means and/or to select the at least one second tripping condition.

6. The power distribution unit in accordance with claim 5, wherein the controller provides status information and/or receives ON/OFF control commands via the digital control interface.

7. The power distribution unit in accordance with claim 1, wherein the arrangement further comprises means for remotely communicating with the controller with wired or wireless data transfer.

8. The power distribution unit in accordance with claim 1, wherein the actuators also have functionality for resetting the levers of the electromechanical circuit breakers into the ON position.

9. The power distribution unit in accordance with claim 1, wherein the actuators comprise a solenoid and a ferromagnetic or permanent magnet core inside the solenoid, the core being movable by supplying current in the solenoid for moving the lever of a circuit breaker into the OFF position.

10. The power distribution unit in accordance with claim 9, wherein the actuators comprise a first solenoid, a second solenoid, and a ferromagnetic or permanent magnet core inside the first and second solenoids, wherein the core is movable in a first direction by supplying current in the first solenoid for moving the lever of a circuit breaker into the OFF position, and the core is movable in a second direction by supplying current in at least the second solenoid for moving the lever of the circuit breaker into the ON position.

11. The power distribution unit in accordance with claim 8, wherein the actuators comprise a solenoid and a permanent magnet core inside the solenoid, wherein the core is movable in a first direction by supplying a first current in the solenoid for moving the lever of a circuit breaker into the OFF position, and the core is movable in a second direction by supplying a second current in the solenoid for moving the lever of the circuit breaker into the ON position, whereby the first and second currents have opposite directions in the solenoid.

12. The power distribution unit in accordance with claim 1, wherein the actuators comprise at least one motor for resetting a lever of one or several electromechanical circuit breakers into ON position.

13. The power distribution unit in accordance with claim 1, wherein the actuators are configured to reset the lever of one of the circuit breakers into the ON position individually, and/or the actuators are configured to reset the levers of at least two circuit breakers into the ON position simultaneously.

* * * * *